United States Patent [19]
Resnick

[11] 3,821,297
[45] June 28, 1974

[54] PURIFICATION OF PERFLUOROSULFONYL FLUORIDE PERFLUOROVINYL ETHERS BY THERMAL DECOMPOSITION OF UNSTABLE ISOMERS

[75] Inventor: Paul Raphael Resnick, Wilmington, Del.

[73] Assignee: E. I. du Pont de Nemours and Company, Wilmington, Del.

[22] Filed: Aug. 18, 1972

[21] Appl. No.: 281,988

Related U.S. Application Data

[63] Continuation-in-part of Ser. No. 44,111, June 8, 1970, abandoned.

[52] U.S. Cl........ 260/543 F, 260/79.7, 260/513 H, 260/611 R, 260/615 BF, 260/616, 260/614 F

[51] Int. Cl................... C07g 143/08, C07g 143/70
[58] Field of Search................................. 260/543 F

[56] References Cited
UNITED STATES PATENTS

| | | | |
|---|---|---|---|
| 3,282,875 | 11/1966 | Connolly et al. | 260/614 F |
| 3,301,893 | 1/1967 | Putnam et al. | 260/543 F |

*Primary Examiner*—Lorraine A. Weinberger
*Assistant Examiner*—Richard D. Kelly

[57] ABSTRACT

The separation of primary perfluorosulfonyl fluoride perfluorovinyl ethers from their isomers by selective pyrolysis and the preparation of copolymers of tetrafluoroethylene from the purified isomers is disclosed.

2 Claims, No Drawings

PURIFICATION OF PERFLUOROSULFONYL FLUORIDE PERFLUOROVINYL ETHERS BY THERMAL DECOMPOSITION OF UNSTABLE ISOMERS

This application is a continuation-in-part of Ser. No. 44,111 filed June 8, 1970, now abandoned, by the same inventor.

This invention relates to copolymerization of tetrafluoroethylene with perfluorosulfonyl fluoride perfluorovinyl ethers, and the preparation of these perfluorovinyl ethers in substantially pure form.

Copolymers of tetrafluoroethylene and perfluorosulfonyl fluoride fluorovinyl ethers have outstanding properties. The inert properties of polytetrafluoroethylene are combined with melt fabricability. It has now been found that those properties can be improved by removing certain isomers associated with the monomeric perfluorovinyl ether, which isomers may act as chain transfer agents resulting in low molecular weight copolymer.

The present invention also relates to a process for polymerizing tetrafluoroethylene with primary isomers of perfluorosulfonyl fluoride perfluorovinyl ethers containing less than 0.3 percent by weight and preferably less than 0.1 percent by weight secondary and tertiary isomers. The invention also relates to a process for producing primary isomers substantially free of either or both secondary or tertiary isomers and a method for separating primary isomer from the secondary and tertiary isomers. The monomeric isomers have the formula $ROCF=CF_2$ where R is a sulfonyl fluoride-containing fluorinated alkyl radical.

The process of separating these isomers is carried out by selective destruction of the secondary and tertiary isomer present by heating the mixture between the temperatures of 250°–350°C. Each of the isomers will be affected to some degree. However, it is found that either or both secondary and tertiary isomers will rearrange almost completely into a form which can be easily removed by distillation or extraction.

This process for purifying substantially pure primary isomer of compounds having the formula $ROCF=CF_2$ where R has the same meaning as defined above, the other isomers having the same number of fluorine and oxygen atoms per molecule as the primary isomer, is characterized by heating a mixture consisting essentially of said isomers at a temperature of between 250°–350°C. and recovering the primary isomer. Preferably, the temperature is at least 300°C.

The carbon atom of R bonded to the oxygen is also bonded only to atoms from the class consisting of carbon and fluorine. By way of example, the primary isomer is perfluoro-3,6-dioxa-4-methyl-7-octene-sulfonyl fluoride (PSEPVE) and there is also present in the mixture the isomer, perfluoro-3,6-dioxa-5-methyl-7-octene-sulfonyl fluoride (iso-PSEPVE).

This invention also comprises a process for copolymerizing tetrafluoroethylene and substantially pure primary isomers of compounds having the formula $ROCF=CF_2$ where R has the same meaning as defined above, said process comprising pyrolyzing a mixture of isomers at a temperature of 250°–350°C. and separating substantially pure primary isomer and copolymerizing said primary isomer with tetrafluoroethylene at temperatures of 30°C. to 85°C. and pressures of 15 psi to 1,000 psi in a nonaqueous solvent, and 50°–110°C. in an aqueous system at pressures of 1–500 psig.

Typical copolymerization methods for polymerizing tetrafluoroethylene and vinyl ethers are described in U.S. Pat. Nos. 3,282,875 and 3,132,123.

Preferably, the isomer to be copolymerized with tetrafluoroethylene is perfluoro-3,6-dioxa-4-methyl-7-octene sulfonyl fluoride.

This invention also comprises the process of preparing the primary vinyl ether by pyrolyzing a compound of the group consisting of the corresponding acid fluoride [$ROCF(CF_3)COF$] or the alkali metal salt [$ROCF(CF_3)COOAlkali\ metal$] of the said fluoride at a temperature of 75° to 600° and subsequently separating the primary isomer from the other isomers formed therewith by heating the mixture substantially free of acid halide at a temperature of between 250°–350°C. and recovering the primary isomer. As illustrated in Example 1, the pyrolysis step in which the ether is formed is typically conducted at a temperature of less than 250°C. and usually less than 200°C., in which case the subsequent heating step (250°–300°C.) involves a heating up of the pyrolysis mixture.

R is a fluorocarbon group which contains a sulfonyl fluoride group, — $SO_2F$, and may optionally contain one or more groups such as ether groups or other functional groups. R has at least 3 carbon atoms. While for purposes of the separation of isomers, no upper limit is necessary on the number of carbons in R for practical purposes, compounds with an R group of 15 or less carbon atoms are more likely to be used.

A primary isomer is one in which the $—OCF=CF_2$ group is connected to a $—CF_2$ group in the R group. A secondary isomer is one in which the $—OCF=CF_2$ group is connected to a $>CF—$ in the R group. A tertiary isomer is one in which the $—OCF=CF_2$ group is connected to a

(carbon) bearing no fluorine.

By substantially free of secondary or tertiary isomer is meant that the primary isomer has less than 0.3 percent by weight of the secondary or tertiary isomer present. Preferably less than 0.1 percent by weight of said isomer is present. It is commercially desirable to prepare copolymers of tetrafluoroethylene and vinyl ethers from primary isomer of the vinyl ether which is substantially free of members of the class consisting of secondary and tertiary isomer and preferably contains less than 0.1 percent thereof.

Typically, the amount of secondary and tertiary isomer associated with the primary isomer in the production of the vinyl ether is greater than 0.1 percent by weight and most often, above 0.3 percent by weight. Thus, in its most significant embodiment, the process of this invention processes a feed stream containing greater than 0.1 percent by weight of members of the class of secondary and tertiary isomer to a product stream with a concentration of less than 0.1 percent by weight of members of that class. Most typically, the feed stream contains greater than 0.3 percent by weight of members of the class of secondary and tertiary isomers and the product stream contains less than 0.3 percent by weight of members of that class.

Specifically, perfluoro-3,6-dioxa-5-methyl-7-octene-sulfonylfluoride (iso PSEPVE) can be removed from perfluoro-3,6-dioxa-4-methyl-7-octenesulfonylfluoride (PSEPVE) by selective pyrolysis. The perfluoro-3,6-dioxa-5-methyl-7-octenesulfonyl-fluoride is rearranged into the compound perfluoro-5-oxa-3-methyl-7-fluorosulfonylheptanoyl fluoride which then may be easily separated from the desired monomer, perfluoro-3,6-dioxa-4-methyl-7-octenesulfonyl fluoride by extraction with dilute aqueous solutions of sodium bicarbonate or potassium bicarbonate at room temperature.

This process also includes within its scope steps of pyrolysis of the isomer followed by dicarboxylation by known methods, in order to separate secondary and tertiary isomers from the desired primary fluorovinyl ethers.

For determining the relative amounts of PSEPVE and iso-PSEPVE, the following gas chromatographic column is used.

Specifically, the first section consists of a 20 feet × 1/4 inch 20 percent polyperfluorocarbonoxide oil (fluorinated oil) [=Krytox" 143 — trade name Du Pont] on 60/80 mesh "Chromosorb P" trade name for calcined diatomaceous earth of Johns Manville Corp. This column shows iso-PSEPVE as a shoulder on the main PSEPVE peak. Temperature should be about 150°C. and the flow rate should be about 20 ml/min. to provide about 11,000 theoretical plates.

Analytic results based on these chromatographic methods depend in part on the integration of the curves for their accuracy. Unless otherwise specified in the examples which follow, these techniques were used to measure isomer content. In the examples, integration was carried out by weighing the areas of chart paper under the chromatographic curves or graphically. It is estimated that experimental error is of the order of 0.02 percent concentration by weight of isomer in the results reported.

Typical perfluorovinyl ethers which may be separated by the process of this invention include:

Vinyl ethers may be prepared by reaction of the appropriate fluorosulfonyl fluoroacyl fluoride with hexafluoropropylene oxide followed by decarboxylation in situ of the sodium salt made from the acyl fluoride product. A general procedure for this synthesis is found in U.S. Pat. No. 3,282,875 to form compounds, in terms of primary isomers, of the formula $FO_2SCFR_fCF_2O(CFYCF_2O)_n CF=CF_2$ wherein $R_f$ is F or perfluoroalkyl having from one to 10 carbon atoms, Y is F or $CF_3$ and n is an integer of 1 to 3.

The determination of melt index or flow rate (melt flow) consists of weighing the amount of resin extruded through a designated orifice at a designated temperature under a designated weight and during a fixed period of time. Melt flow of The IEE/PSEPVE copolymer is defined as the weight in grams extruded in 10 minutes through a 0.0825 inch diameter orifice 0.315 inch long at 250°C., when subjected to a load of 500 g.

The water absorptivity is defined as the percent weight increase in weight due to the absorption of water in the copolymer of TFE and PSEPVE after the sulfonyl fluoride groups ($SO_2F$) are converted to sulfonic acid groups ($SO_3H$).

A sample of polymer is pressed into a 10 mil thick film, the —$SO_2F$ groups hydrolyzed by dilute sodium hydroxide to —$SO_3Na$ groups and these acidified with hydrochloric acid to give polymer with sulfonic acid groups. A sample of this polymer, c.a. five-eighths sq. in., is immersed in boiling water for 10–15 minutes, removed and washed at room temperature with water, dilute sulfuric acid and twice more with water. The film is removed from the last water bath, the excess water wiped off and weighed. The dry weight of the film is determined by drying the sample in a vacuum oven at 104°–7° for 30–40 minutes. The water absorptivity is calculated from these two weights.

The equivalent weight of the polymer is defined as that weight of polymer which contains one gram equivalent of —$SO_3H$. A sample of polymer is hydrolyzed with aqueous sodium hydroxide to convert all the sulfo-

| More stable | From | Less stable (may be separated) |
| --- | --- | --- |
| $CF_3CF_2CF_2CF_2OCF=CF_2$ | | $CF_3CF_2CFOCF=CF_2$ <br> $\quad\quad\quad\quad\;\; |$ <br> $\quad\quad\quad\quad\;\; CF_3$ |
| $CF_3CFCF_2OCF=CF_2$ <br> $\quad\;\; |$ <br> $\quad\;\; CF_3$ | | $CF_3$ <br> $\;\;|$ <br> $CF_3COCF=CF_2$ <br> $\;\;|$ <br> $\;\;CF_3$ |
| $CF_3CF_2CF_2CF_2CF_2OCF=CF_2$ | | $CF_3CF_2CF_2CFOCF=CF_2$ <br> $\quad\quad\quad\quad\quad\;\; |$ <br> $\quad\quad\quad\quad\quad\;\; CF_3$ |
| $CF_2-CF_2$ <br> $/\quad\quad\;\;\backslash$ <br> $CF_2 \quad\quad CF-CF_2OCF=CF_2$ <br> $\backslash\quad\quad\;\;/$ <br> $\;\;CF_2-CF_2$ | | $CF_2-CF_2$ <br> $/\quad\quad\;\;\backslash$ <br> $CF_3-CF \quad\quad CFOCF=CF_2$ <br> $\quad\;\;\backslash\quad\quad\;\;/$ <br> $\quad\;\;\;CF_2-CF_2$ |
| $CF_3CFCF_2CF_2OCF=CF_2$ <br> $\quad\;\; |$ <br> $\quad\;\; CF_3$ | | $CF_3CF_2CFOCF=CF_2$ <br> $\quad\quad\quad\;\; |$ <br> $\quad\quad\quad\;\; CF_2CF_3$ |
| $CF_3CF_2CFCF_2OCF=CF_2$ <br> $\quad\quad\;\; |$ <br> $\quad\quad\;\; CF_3$ | | $CF_3$ <br> $\;\;|$ <br> $CF_2CF_2C-OCF=CF_2$ <br> $\quad\quad\quad\;\; |$ <br> $\quad\quad\quad\;\; CF_3$ |
| $CF_2ClCFClCF_2OCF=CF_2$ | | $CF_2ClCFOCF=CF_2$ <br> $\quad\quad\;\; |$ <br> $\quad\quad\;\; CF_2Cl$ |
| $FSO_2CF_2CF_2OCFCF_2OCF=CF_2$ <br> $\quad\quad\quad\quad\quad\;\; |$ <br> $\quad\quad\quad\quad\quad\;\; CF_3$ | | $FSO_2CF_2CF_2OCF_2CFOCF=CF_2$ <br> $\quad\quad\quad\quad\quad\quad\quad\;\; |$ <br> $\quad\quad\quad\quad\quad\quad\quad\;\; CF_3$ |
| $CF_3CF_2CF_2OCF=CF_2$ | | $CF_3CFOCF=CF_2$ <br> $\quad\;\; |$ <br> $\quad\;\; CF_3$ |
| $CF_3CF_2CF_2OCFCF_2OCF=CF_2$ <br> $\quad\quad\quad\quad\;\; |$ <br> $\quad\quad\quad\quad\;\; CF_3$ | | $CF_3CF_2CF_2OCF_2CFOCF=CF_2$ <br> $\quad\quad\quad\quad\quad\quad\;\; |$ <br> $\quad\quad\quad\quad\quad\quad\;\; CF_3$ | nyl fluoride groups to —SO₃Na groups. The latter are converted to —SO₃H groups by treatment with dilute hydrochloric acid. After all the excess hydrochloric acid has been carefully washed from the polymer and the polymer dried to constant weight, the equivalent weight of the polymer is determined by titration of a weighed polymer sample with standardized sodium hydroxide solution.

The term "melt viscosity" means the apparent melt viscosity as measured at 380°C. (or 300°C.) under a shear stress of 6.5 lbs per square inch. The melt viscosity is determined by using a melt indexer of the type described in ASTM D1238-52-T, modified for corrosion resistance to embody a cylinder, orifice, and piston weighing about 50 grams, made of stellite cobalt-chromium-tungsten alloy. The resin (5.0 grams) is charged to the 0.375 inch I. D. cylinder which is held at 380°C. ± 5°C. (or 300°C. ± 5°C.) and allowed to come to equilibrium temperature during 5 minutes. Then it is extruded through the 0.0825 inch diameter, 0.315 inch long orifice under a piston loading of 5,000 grams. The melt viscosity in poises is calculated as 53,150 divided by the observed extrusion rate in grams per minute.

In the Examples which follow, all parts are by weight unless otherwise indicated.

EXAMPLE 1

Preparation of PSEPVE

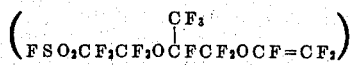

The addition product of two moles of hexafluoropropylene oxide (HFPO) to one molecule of fluorosulfonyldifluoroacetyl fluoride (diadduct) is prepared as taught in U.S. Pat. No. 3,301,893.

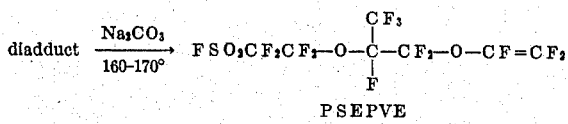

A reaction flask was charged with 1,800 g of anhydrous Na₂CO₃ (dried over silica gel). The slurry was heated to 165° and 4,983 g of the diadduct was added with vigorous stirring over 8 hours. The PSEPVE was continuously removed from the reaction via a liquid-liquid separator. The crude PSEPVE (4052 g) was washed once with water and steam distilled to give 3,712 g of wet PSEPVE plus 259 g of an unidentified residual oil. The steam-distilled PSEPVE was dried over silica gel and distilled to obtain 2,903 g. PSEPVE normal b.p. 132°–134°C. The distilled PSEPVE was further purified by passing it through a column of silica gel and storing it over silica gel.

The factors effecting yields are dryness of reactants, temperature, and contact time. Secondary isomers are often present when PSEPVE is prepared by this route.

EXAMPLE 2

A dry 30 ml. stainless steel cylinder is charged with 1 g. of previously dried (heated 20 hours at 400°C. in vacuo) "Darco", commercially available activated carbon, and is cooled to −180°C. and evacuated. There is then introduced 8.7 grams of hexafluoropropylene epoxide and 8.7 g. of pentafluoropropionyl fluoride. The mixture is slowly warmed to room temperature and kept at room temperature for 2 days. On workup, there is obtained 7.8 g. of perfluoro-2-propoxypropionyl fluoride having a boiling point of 55° to 57°C. Both epoxide and perfluoropropionyl fluoride are recovered in nearly equal amounts indicating that the product is formed by interaction of acid fluoride and epoxide.

Perfluoro-2-propoxypropionyl fluoride so prepared is also charged into a polyethylene bottle equipped with a Dry Ice condenser. There is then added 15 weight percent, based on the weight of the acid fluoride of water. The reaction mixture is neutralized to phenolphthalein end point with 10 N KOH in water and was evaporated in dryness at 35°C. The dry mixture of potassium perfluoro-2-propoxypropionate and potassium fluoride is further dried in vacuo at 100°C. The resulting mixture is placed in a glass reaction vessel equipped with a Dry Ice trap. The vessel is heated to 185° to 215°C. for a period of 24 hours. Perfluoro(propyl vinyl) ether is obtained on distillation of the product in the trap.

EXAMPLE 3

Copolymer of TFE/PPVE is prepared by the following procedure:

Into an evacuated stainless steel 100 ml. autoclave fitted with a magnetically driven stirrer is placed a solution of 9 g. of perfluoropropyl perfluorovinyl ether (0.034 mol) in 64 ml. of perfluorodimethylcyclobutane. The solution is heated to 60°C., whereupon tetrafluoroethylene is admitted to the autoclave until a pressure of 268 psig is attained. To the rapidly stirred mixture is added approximately 10⁻⁴ mol of N₂F₂ diluted with nitrogen. The contents of the autoclave are heated and stirred for 1 hour at 60°C., and then cooled and gaseous materials vented off. The solid polymer obtained weighs 15.0 g. and had a melt viscosity at 380°C. of $3.6 \times 10^4$ poises. Films of the copolymer pressed at 350°C. and 20,000 psi platen pressure are tough, clear and colorless. Infrared analysis of the resin indicates the presence of 9.7 wt. percent perfluoro (propyl vinyl) ether.

EXAMPLE 4

Polymerization of PSEPVE and TFE

The Polymerization system consisted of a 3-gallon jacketed stainless steel autoclave with a helical agitator. A water cooled container and a wet-ice trap followed by a Dry-Ice trap were provided in the vent line from the reactor to condense the reaction monomer solution during boil-out. The charge to the reactor consisted of a total of 13,342 grams total, comprising by weight percent 52.2 percent PSEPVE with no iso-PSEPVE 2.0 percent, hydro-PSEPVE,

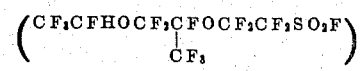

and 45.8 percent "Freon"-113.

The polymerization kettle was kept at a pressure of 90 psig and a temperature of 45°C. for three hours using 200 rpm agitation. A solution of perfluoropropionyl peroxide in the amount of 0.115 g. per cc. of "Freon"-113 was prepared, 2.5 cc. of solution was added initially and 0.5 cc. of solution was added each half hour for 2½ hours.

The yield was 1040 grams of polymer of equivalent weight of 1,095 with a melt flow of 3.6 g. per 10 minutes and a water absorptivity of 31.6 percent.

EXAMPLES SHOWING THE SEPARATION OF ISOMERS

EXAMPLE 5

The primary isomer PPVE and the other isomers incidental to production of the primary isomer according to the method of Example 2 were passed through a tube over sodium carbonate at the temperatures indicated. The average contact time over sodium carbonate was 22 seconds. The feed and product concentrations of the undesirable isomer are listed in addition to the percent product recovery of the desirable isomer.

| Temp. | % of A in $CF_3CF_2CF_2OCF=CF_2$ (PPVE) | | Product Recovery |
|---|---|---|---|
| | Feed | Product | |
| 250 | 0.66 | 0.61 | 95% |
| 280 | 0.50 | 0.23 | — |
| 300 | 0.65 | 0.10 | 97% |
| 300 | 0.37 | 0.10 | 90% |
| 300 | 0.37 | 0.08 | 95% |
| 300 | 0.37 | 0.10 | 97% |
| 300 | 0.37 | 0.07 | 93% |
| 300 | 0.37 | 0.08 | 97% |
| 300 | 0.37 | 0.15 | 91% |
| 320 | 0.26 | 0.10 | 88% |

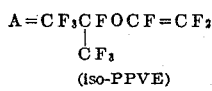

$$A = CF_3CFOCF=CF_2$$
$$\phantom{A=}|$$
$$\phantom{A=}CF_3$$
(Iso-PPVE)

EXAMPLE 6

A stainless steel tube four inches in diameter and five feet long was filled with ten pounds of anhydrous sodium carbonate. The tube was heated to 300°C. and the sodium carbonate fluidized. Then 11.5 pounds of PPVE containing 0.65 percent iso-PPVE was fed through the tube in 68 minutes. The PPVE recovered weighed 11.2 pounds and contained 0.10 percent iso-PPVE.

Analogous experiments were performed using potassium carbonate, glass beads or stainless steel mesh in place of the sodium carbonate. However because of ease in handling, heat transfer, etc., the use of carbonate is preferred.

EXAMPLE 7

The following is an example of the selective pyrolysis resulting in the removal of (perfluoro-3,6-dioxa-5-methyl-7-octene-sulfonyl fluoride) (I) from perfluoro-3,6-dioxa-4-methyl-7-octene-sulfonyl fluoride (II). They are prepared by the process of Example 1.

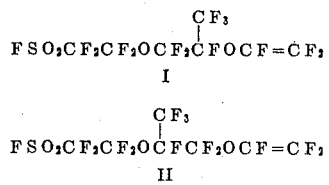

$$\phantom{FSO_2CF_2CF_2OCF_2}CF_3$$
$$\phantom{FSO_2CF_2CF_2OCF_2}|$$
$$FSO_2CF_2CF_2OCF_2CFOCF=CF_2$$
I $$\phantom{FSO_2CF_2CF_2O}CF_3$$
$$\phantom{FSO_2CF_2CF_2O}|$$
$$FSO_2CF_2CF_2OCFCF_2OCF=CF_2$$
II A vertically mounted glass tube 12 inches × 1 inch OD was filled with glass beads and topped by a pressure equalizing dropping funnel. The outlet of the tube was connected to a trap cooled to −78°C. The apparatus was flushed with nitrogen and 10 g of crude (II) containing some (I) was added to the funnel. The glass tube was heated to 300° and the sample added in 4 minutes. The recovered product, 8.5 g, was a colorless liquid. Gas chromatographic analysis showed that no more (I) remained.

EXAMPLE 8

A perfluorinated vinyl ether mixture was passed through a 12 inch by 1 inch diameter glass tube heated by a split tube furnace. The vinyl ether mixture vapor was carried by a stream of nitrogen through the glass tube and multiple cold traps in which the reaction product was collected.

The tube was heated to 300° and 6.00 g of a mixture containing 83.3 percent perfluoro (3-oxa-1-octene) and 16.7 percent perfluoro-(3-oxa-4-ethyl-1-hexene) passed through the tube in 8 minutes. Infrared spectral analysis of the vinyl ether product showed it to be a mixture of 98 percent perfluoro (3-oxa-1-octene) and 2 percent perfluoro-(3-oxa-4-ethyl-1-hexene).

EXAMPLE 9

Using the apparatus and procedure of Example 8, the tube was heated to 275° and 2.30 g of a mixture containing 87.0 percent perfluoro(3-oxa-1-octene) and 13.0 percent perfluoro(3-oxa-4-ethyl-1-hexene) passed through the tube in 4 minutes. Infrared spectral analysis of the vinyl ether product showed it to be all perfluoro(3-oxa-1-octene).

EXAMPLE 10

Using the apparatus and procedure of Example 8, the tube was heated to 275° and 2.30 g of a mixture containing 87 percent perfluoro(3-oxa-1-octene) and 13 pecent perfluoro(3-oxa-4,5-dimethyl-1-hexene) passed through the tube in 3.5 minutes. Infrared spectral analysis of the vinyl ether product showed it to be all perfluoro-(3-oxa-1-octene).

EXAMPLE 11

Using the apparatus and procedure of Example 8, the tube was heated to 275° and 6.1 g of a mixture containing 90.6 percent perfluoro(3,6-dioxa-5-methyl-1-nonene) and 9.4 percent perfluoro(3,6-dioxa-4-methyl-1-nonene) passed through the tube in 21 minutes. The vinyl ether product was converted by reaction with cesium fluoride, dimethyl formamide and water to a mixture of 98.8 percent perfluoro(3,6-dioxa-5-methyl-2-hydrononane) and 1.2 percent perfluoro-(3,6-dioxa-4-methyl-2-hydrononane) showing that the percentage of perfluoro(3,6-dioxa-4-methyl-1-nonene) in the vinyl ether mixture had decreased from 9.4 percent to 1.2 percent upon heating.

EXAMPLE 12

Using the apparatus and procedure of Example 8, the tube was heated to 275° and 8.5 g of the same mixture used in Example 11 passed through the tube in 3.0 minutes. The vinyl ether product, 6.9 g, was treated as in Example 12 to give a mixture of 97.8 percent perfluoro(3,6-dioxa-5-methyl-2-hydrononane) and 2.2 percent perfluoro(3,6-dioxa-4-methyl-2-hydrononane) showing that the percentage of perfluoro(3,6-dioxa-4-methyl-1-nonene) in the vinyl ether mixture had decreased from 9.4 to 2.2 percent upon heating.

The purified isomer is useful at least in preparing copolymers with TFE having utility as self-supporting films and molded articles. The copolymers of TFE and the purified isomers are melt fabricable.

I claim:

1. In the process for the preparation of perfluorosulfonyl fluoride perfluorovinyl ethers having the formula $ROCF=CF_2$, where R is a sulfonyl fluoride-containing fluorinated alkyl radical having three to 15 carbon atoms, wherein mixtures of the primary isomer and other isomer thereof having the same number of fluorine and oxygen atoms per molecule as the primary isomer are present, the improvement comprising an additional heating of said mixture consisting essentially of said isomers at a temperature of between 250°–350°C. to selectively destroy said other isomer and separating the purified primary isomer from the products of the destroyed isomer, the $-OCF=CF_2$ group of the primary isomer being connected to a $CF_2$ group in R and the $-OCF=CF_2$ group of said other isomer being connected to a secondary or tertiary carbon atom.

2. Process of claim 1 wherein the primary isomer is perfluoro-3,6-dioxa-4-methyl-7-octene-sulfonyl fluoride and there is also present in the mixture the isomer perfluoro-3,6-dioxa-5-methyl-7-octene-sulfonyl fluoride.

* * * * *